US011593043B2

(12) United States Patent
Yamada

(10) Patent No.: US 11,593,043 B2
(45) Date of Patent: Feb. 28, 2023

(54) PRINTING DEVICE CAPABLE OF STARTING SPECIFIC PRINTING UNDER CONTRACT AT A SUITABLE TIMING, PRINTING SYSTEM INCLUDING THE PRINTING DEVICE, AND METHOD FOR CONTROLLING THE PRINTING DEVICE

(71) Applicant: Brother Kogyo Kabushiki Kaisha, Nagoya (JP)

(72) Inventor: Takatsugu Yamada, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/458,796

(22) Filed: Aug. 27, 2021

(65) Prior Publication Data

US 2022/0100440 A1 Mar. 31, 2022

(30) Foreign Application Priority Data

Sep. 30, 2020 (JP) ............................ JP2020-164988

(51) Int. Cl.
*G06F 3/12* (2006.01)

(52) U.S. Cl.
CPC .......... *G06F 3/1219* (2013.01); *G06F 3/1259* (2013.01); *G06F 3/1286* (2013.01)

(58) Field of Classification Search
None
See application file for complete search history.

(56) References Cited

U.S. PATENT DOCUMENTS 11,379,701 B2 * 7/2022 Nagasaki ................ G06F 21/31
2004/0044558 A1 3/2004 Ohwa
(Continued)

FOREIGN PATENT DOCUMENTS

JP 2007-223211 A1 9/2007
JP 2013-071266 A1 4/2013
(Continued)

OTHER PUBLICATIONS

International Search Report and Written Opinion (Application No. PCT/JP2021/031519) dated Nov. 2, 2021.

*Primary Examiner* — Henok Shiferaw
(74) *Attorney, Agent, or Firm* — Burr Patent Law, PLLC

(57) ABSTRACT

A printing device includes: a communication interface communicable with a server; and a controller. The controller is configured to perform: a communication status monitoring process to monitor a communication state with the server; a consumable determination process; and a transition process. The consumable determination process is to determine whether a particular consumable is included in one or more of consumables attached to the printing device, the particular consumable being a consumable that meets a prescribed condition required for transition to a specific printing state where specific printing under a contract with the server is allowed. The transition process is to execute the transition to the specific printing state in a case where: the communication state is determined to be communicable with the server in the communication status monitoring process; and the particular consumable is determined to be included in the one or more of consumables in the consumable determination process.

15 Claims, 8 Drawing Sheets

(56) References Cited

U.S. PATENT DOCUMENTS

| | | | | |
|---|---|---|---|---|
| 2011/0234656 | A1* | 9/2011 | Mizutani | G06Q 10/087<br>340/10.1 |
| 2012/0027423 | A1* | 2/2012 | Kawai | G03G 15/556<br>399/27 |
| 2015/0277817 | A1* | 10/2015 | Tsujioka | G06F 3/1289<br>358/1.14 |
| 2016/0292550 | A1* | 10/2016 | Kawai | G06K 15/102 |
| 2018/0101336 | A1* | 4/2018 | Onomatsu | H04N 1/00973 |
| 2019/0107984 | A1* | 4/2019 | Kanamori | G06F 3/1285 |
| 2022/0050646 | A1* | 2/2022 | Kojima | G06F 3/121 |
| 2022/0103717 | A1* | 3/2022 | Yamada | G06Q 30/02 |

FOREIGN PATENT DOCUMENTS

| | | | |
|---|---|---|---|
| JP | 2016-193592 | A | 11/2016 |
| JP | 2017-047590 | A1 | 3/2017 |

* cited by examiner

FIG. 3

| | CARTRIDGE ID | CARTRIDGE TYPE | INK RESIDUAL AMOUNT |
|---|---|---|---|
| BK | bk6845 | COMMERCIAL | 50% |
| C | NO CARTRIDGE | NO CARTRIDGE | NO CARTRIDGE |
| M | m9843 | COMMERCIAL | 10% |
| Y | y0652 | CONTRACT | EMPTY |

FIG. 4

| ERROR IDENTIFIER | APPROPRIATENESS FOR TRANSITION | ERROR TYPE |
|---|---|---|
| MACHINE ERROR XX | INAPPROPRIATE | A |
| PRINT UNABLE YY | INAPPROPRIATE | A |
| MEMORY FULL ERROR | INAPPROPRIATE | B |
| DOCUMENT JAM | APPROPRIATE | C |
| COVER OPEN | APPROPRIATE | C |
| INK LOW | APPROPRIATE | C |
| INK EMPTY | APPROPRIATE | C |
| NO CARTRIDGE | APPROPRIATE | C |
| : | : | : |

PRINTING DEVICE CAPABLE OF STARTING SPECIFIC PRINTING UNDER CONTRACT AT A SUITABLE TIMING, PRINTING SYSTEM INCLUDING THE PRINTING DEVICE, AND METHOD FOR CONTROLLING THE PRINTING DEVICE

CROSS REFERENCE TO RELATED APPLICATION

This application claims priority from Japanese Patent Application No. 2020-164988 filed Sep. 30, 2020. The entire content of the priority application is incorporated herein by reference.

TECHNICAL FIELD

The present disclosure relates to a printing device, a printing system including the printing device, and a method for controlling the printing device.

BACKGROUND

As disclosed in Japanese Patent Application Publication No. 2016-193592 for example, flat-rate printing service has recently become popular among users of printing devices. The flat-rate printing service is a type of service that a user can sign up on a device-by-device basis, and is also called as subscription service. For example, under the flat-rate printing service, printing up to a predetermined number of pages is permitted with a fixed charge within a prescribed period under a contract. Overage charge may be applied to printing in excess of the predetermined amount that is specified by the contract.

SUMMARY

When a user subscribes to flat-rate printing service, various information is exchanged between a server of a service provider and a printing device of the user. Such exchange is required for the provider-side server to identify the printing device as a subject of the contract, and also for the user to make various settings on the user's printing device to receive the flat-rate printing service.

In a printing system including the above-described printing device and server, the settings on the printing device should be performed at an appropriate timing.

In view of the foregoing, it is an object of the disclosure to provide a printing device capable of executing settings required to implement specific service for printing (such as flat-rate printing service) at an appropriate timing, a printing system capable of allowing the printing device to execute such settings, and a method of controlling the printing device.

In order to attain the above and other objects, according to one aspect, the disclosure provides a printing device configured to execute specific printing under a contract with a server. The printing device includes: a communication interface communicable with the server; and a controller. The controller is configured to perform: a communication status monitoring process; a consumable determination process; and a transition process. The communication status monitoring process is to monitor a communication state with the server through the communication interface. The consumable determination process is to determine whether a particular consumable is included in one or more of consumables attached to the printing device, the particular consumable being a consumable that meets a prescribed condition required for transition to a specific printing state where the specific printing under the contract is allowed. The transition process is to execute the transition to the specific printing state in a case where: the communication state is determined to be communicable with the server in the communication status monitoring process; and the particular consumable is determined to be included in the one or more of consumables in the consumable determination process.

According to another aspect, the disclosure provides a printing system including a server and a printing device capable of executing specific printing under a contract with the server. The printing device includes: a communication interface communicable with the server; and a controller. The controller is configured to perform: a communication status monitoring process; a consumable determination process; and a transition process. The communication status monitoring process is to monitor a communication state with the server through the communication interface. The consumable determination process is to determine whether a particular consumable is included in one or more of consumables attached to the printing device, the particular consumable being a consumable that meets a prescribed condition required for transition to a specific printing state where the specific printing under the contract is allowed. The transition process is to execute the transition to the specific printing state in a case where: the communication state is determined to be communicable with the server in the communication status monitoring process; and the particular consumable is determined to be included in the one or more of consumables in the consumable determination process.

According to still another aspect, the disclosure also provides a method for controlling a printing device. The method includes: a consumable determination step; and a transition step. The consumable determination step is to determine whether a particular consumable is included in one or more of consumables attached to the printing device, the particular consumable being a consumable that meets a prescribed condition required for the printing device to execute transition to a specific printing state where specific printing under a contact with a server is allowed. The transition step is to execute the transition of the printing device to the specific printing state in a case where: the printing device is communicable with the server; and the particular consumable is determined to be included in the one or more of consumables attached to the printing device in the consumable determination step.

According to still another aspect, the disclosure also provides a printing device configured to execute specific printing under a contract with a server. The printing device includes: a communication interface communicable with the server; and a controller. The controller is configured to perform: a communication status monitoring process; a consumable determination process; and a transition process. The communication status monitoring process is to monitor a communication state with the server through the communication interface. The consumable determination process is to determine whether a particular consumable is included in one or more of consumables attached to the printing device, the particular consumable being a consumable deemed suitable for being used in the specific printing under the contract. The transition process is to execute the transition to a specific printing state where the specific printing is allowed in a case where prescribed conditions are all met. The prescribed conditions include: i) the communication state is determined to be communicable with the server in the communication status monitoring process; and ii) the particular consumable is determined to be included in the one or more of consumables in the consumable determination process.

BRIEF DESCRIPTION OF THE DRAWINGS

The particular features and advantages of the embodiment(s) as well as other objects will become apparent from the following description taken in connection with the accompanying drawings, in which:

FIG. 3 is a view illustrating a specific example of cartridge information stored in a region 821 of the printing device 1 according to the first embodiment;

FIG. 4 is a view illustrating a specific example of a determination table stored in a region 825 of the printing device 1 according to the first embodiment;

DETAILED DESCRIPTION

1. First Embodiment

<Agenda>

For using a flat-rate printing service, a service provider thereof (hereinafter, referred to simply as "provider") may sometimes require a user to use particular consumables (such as ink cartridges) dedicated for use in the flat-rate printing service. In many cases, such dedicated consumables for the flat-rate printing service are provided free of charge or at low prices from the provider. The provider may recover the cost of the dedicated consumables for the flat-rate printing service through appropriate means, for example, through user's payment of the fee for using the flat-rate printing service. To implement such flat-rate printing service, there is required a printing system where a user's printing device be properly identified as a device which is the subject of an agreement (contract) between a provider and the user (hereinafter, referred to as "contract-covered device").

In order to properly recognize the user-side printing device as a contract-covered device on the printing system, a series of information processing including a procedure to conclude the contract (contract procedure) needs to be performed between the printing device and the provider-side server. Preferably, such information processing not be started if the user's printing device is unlikely to complete the information processing relating to the contact procedure. For example, the user's printing device may be deemed difficult to complete the information processing in relation to the contract procedure in a case where a dedicated consumable for the flat-rate printing service is used in the user-side printing device in a manner unexpected by the provider. Alternatively, the printing device may be deemed difficult to complete the information processing if: a serious error is occurring in the user's printing device (for example, an error that may hinder communication of the printing device with the server or an error that may hinder execution of the above information processing); or the printing device is executing other processing with a higher priority.

A printing device according to a first embodiment of the disclosure is contrived to prevent the information processing relating to the contract procedure for registration as a contract-covered device from being executed in the printing device in an undesirable state.

<Overview of the Printing System 100>

Hereinafter, the first embodiment of the present disclosure will be described with reference to FIGS. 1A through 5.

Figure 1A:
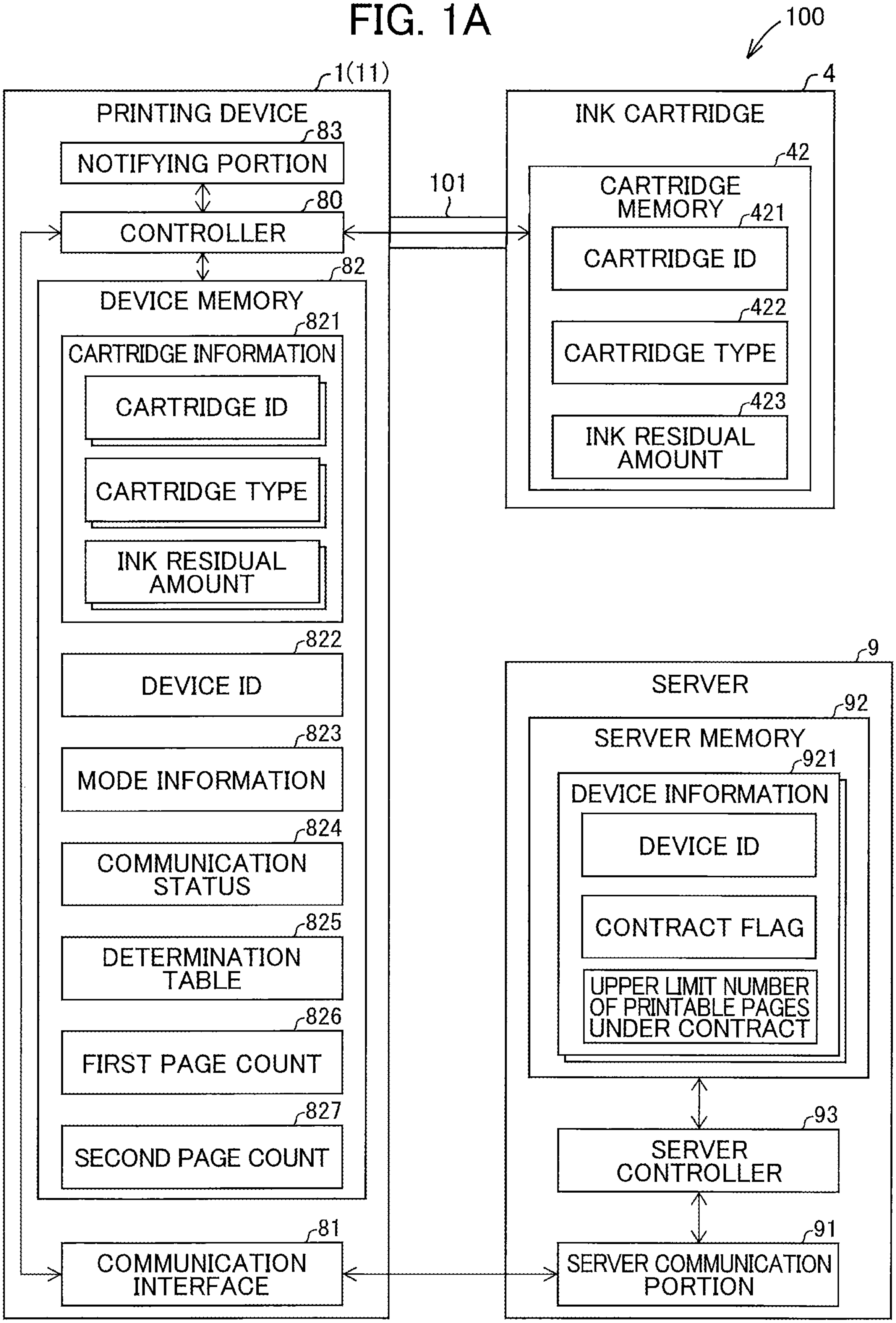
FIG. 1A is a block diagram illustrating essential configurations of a printing device 1, an ink cartridge 4, and a server 9 in a printing system 100 according to a first embodiment of the disclosure.

As illustrated in FIG. 1A, a printing system 100 according to the first embodiment includes a printing device 1, an ink cartridge 4, and a server 9.

Upon establishment of a contract between a user of the printing device 1 and a service provider of a flat-rate printing service, the printing device 1 according to the first embodiment is allowed to use consumables or replacement parts dedicated for the contract. As an example, the contract is made, between the user and the service provider, about a period and a necessary charge for using the flat-rate printing service, and an upper limit in number of printable pages, meaning that both of the user and the service provider have reached an agreement that the service provider provides the flat-rate printing service to the user. In other words, once the contract for the flat-rate printing service is concluded, the printing device 1 according to the first embodiment can execute flat-rate printing, i.e., printing under the contract.

In the flat-rate printing service, the followings (1) and (2) may differ in timing from each other.

(1) Timing at which the server 9 recognizes the printing device 1 as a contract-covered device.

(2) Timing at which the server 9 recognizes that use of the flat-rate printing service on the printing device 1 is started.

That is, in the flat-rate printing service, the server 9 may recognize that "the printing device 1 is a contract-covered device, but the printing device 1 has not started using the flat-rate printing service". Further, "start using the flat-rate printing service" simply means "the service is started to be used" and does not necessarily mean that the flat-rate printing is indeed performed.

Further, in a case where the flat-rate printing service is a paid service as described above, the timing of (2) may be considered as being the same as the "timing at which the printing device 1 starts to be charged for the flat-rate printing service". In this specification, the flat-rate printing service is defined as a paid service unless otherwise noted. Accordingly, the timing of (2) is defined as the timing at which the charging to the printing device 1 is started.

The printing device 1 may be of any type, provided that the printing device 1 has a communication function and an ability to perform printing using consumables such as ink cartridges or toner cartridges. For example, the printing device 1 may be an ink-jet printer or a laser printer.

Alternatively, the printing device 1 may be an MFP (Multi-Function Printer) having other functions such as a scanner function and/or a facsimile function.

Figure 1B:
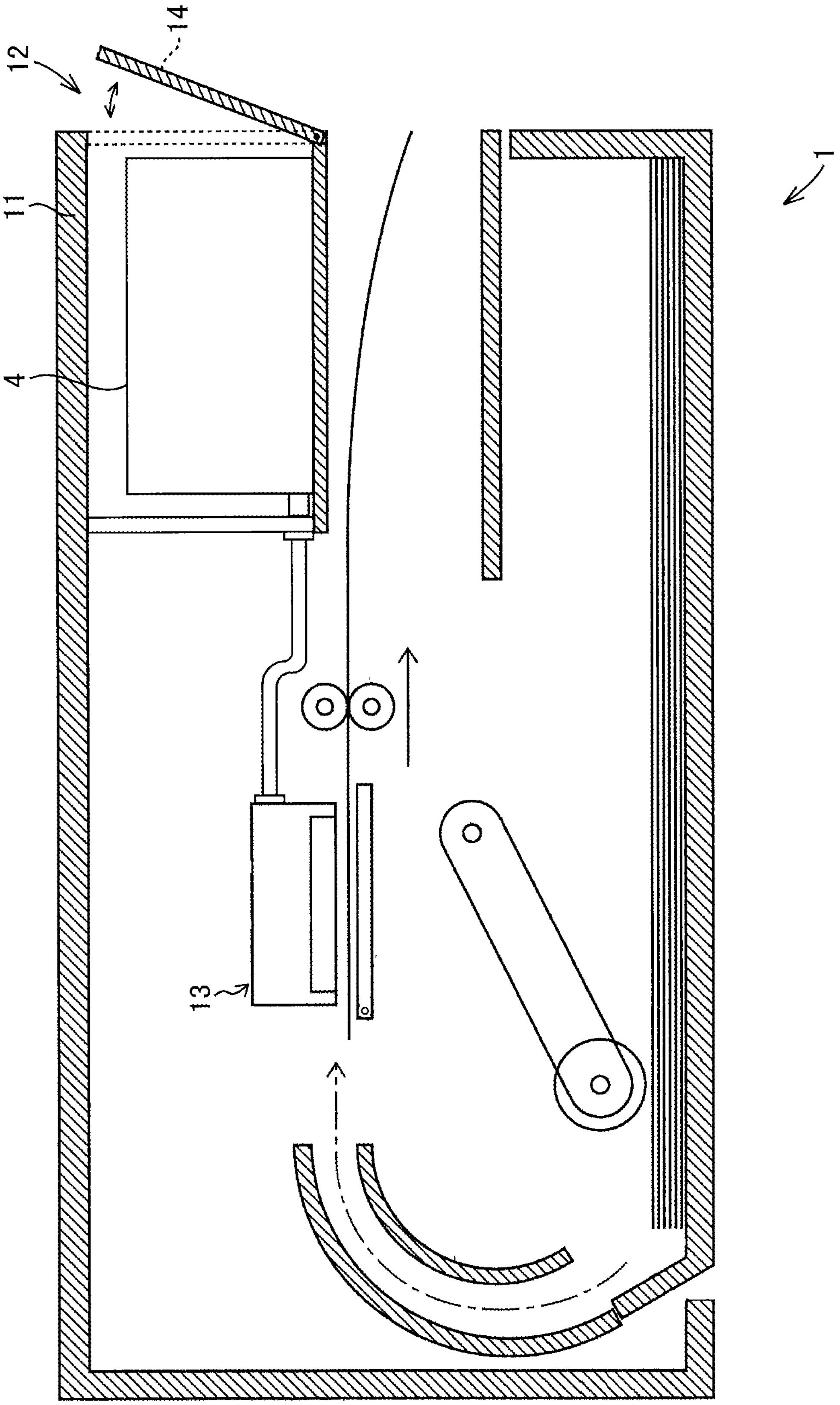
FIG. 1B is a schematic diagram illustrating an overall structure of the printing device 1 in the printing system 100 according to the first embodiment.

In the present embodiment, the printing device 1 is assumed to be an ink-jet printer configured to perform printing on sheets of paper based on print data by ejecting ink. As illustrated in FIG. 1B, the printing device 1 includes a housing 11 to which one or more of ink cartridges are attachable. In the present embodiment, four kinds of ink cartridges 4 corresponding to four colors of cyan (C), magenta (M), yellow (Y), and black (BK) are used in the printing device 1. Although not illustrated, the printing device 1 may include a display (such as a liquid crystal display and/or a lamp), and an inputting device such as buttons. The liquid crystal display may be integrated with a touch panel to function as the inputting device.

The server 9 is a management apparatus to manage or supervise one or more of the printing devices 1. In the example depicted in FIG. 2, the server 9 is connected to only one printing device 1; however, the server 9 may be communicably connected to a plurality of the printing devices 1.

The server 9 is used by the service provider. The server 9 is communicable with the printing device 1 over a communication network. The server 9 is configured to complete a series of information processing in relation to a contract procedure in cooperation with the printing device 1 over the communication network. Hereinafter, the series of information processing relating to the contract procedure is simply referred to as "contract-related processing". Upon completion of the contract-related processing, the server 9 can recognize the printing device 1 as a contract-covered device, whereby the printing device 1 is finally registered as a contract-covered device on the printing system 100.

In the present embodiment, in response to recognizing the printing device 1 as a contract-covered device, the server 9 determines that dedicated consumables for the contract designated by the provider be delivered to the user. The user of the printing device 1 attaches the delivered consumables to the printing device 1, which enables the printing device 1 to perform the flat-rate printing.

<Internal Configurations of the Printing Device 1, Ink Cartridge 4, and Server 9>

FIG. 1A is a block diagram illustrating essential configurations of the printing device 1, ink cartridge 4, and server 9 according to the first embodiment of the disclosure.

Ink Cartridge 4

The ink cartridge 4 includes a cartridge memory 42. The cartridge memory 42 is a memory from/to which information can be read/written. The cartridge memory 42 may be, for example, a flash ROM (Read Only Memory) or an EEPROM® (Electrically Erasable Programmable ROM).

The cartridge memory 42 has a first region 421, a second region 422, and a third region 423 for storing information on the ink cartridge 4. Specifically, the first region 421 stores a cartridge ID. The second region 422 stores a cartridge type. The third region 423 stores a residual amount of ink. The third region 423 may be a rewritable region. Incidentally, each of the regions 421, 423 for storing the cartridge ID and the ink residual amount may be omitted as appropriate.

The cartridge ID is, for example, a unique serial number for identifying each one of the ink cartridges 4. The cartridge ID may include information indicative of a color, a model number, a manufacturer, and a production lot of the corresponding ink cartridge 4.

The cartridge type is information indicative of a type of the ink cartridge 4. In the present embodiment, the type of the ink cartridge 4 may be set to one from at least one of the following two types: "contract" and "commercial". A cartridge type "bundled" may be a third option to be set as the type of the ink cartridge 4. Details of the "bundled" type will be described in greater detail later in a third embodiment.

The ink cartridge whose cartridge type stored in the second region 422 indicates "contract" is an ink cartridge for exclusive use in the flat-rate printing. Hereinafter, the ink cartridge of this type is referred to as "contract ink cartridge (contract-only consumable)". The printing device 1 is allowed to execute the flat-rate printing as long as the contract ink cartridge is attached to the printing device 1. The contract ink cartridge is provided from a provider thereof to a user who has concluded a contract on the printing device 1 with the provider.

The ink cartridge whose cartridge type stored in the second region 422 indicates "commercial" is an ink cartridge that is available on a market and that can be purchased at electronics retail stores or on online shopping sites. Hereinafter, the ink cartridge of this type is referred to as "commercial ink cartridge". The commercial ink cartridge may be a so-called genuine product manufactured by a manufacturer of the printing device 1 or a so-called third-party product manufactured by a third party other than the manufacturer.

The ink residual amount is information indicative of a residual amount of ink stored in the ink cartridge 4. For example, in the present embodiment, the ink residual amount stored in the third region 423 is represented by one of values corresponding to a plurality of levels from a full state to an empty state. The levels of the ink residual amount may be notified to the user, for example, in a form of words from "FULL" to "EMPTY", numerical values from "100%" to "0%", or a combination thereof based on the values stored in the third region 423.

Printing Device 1

The printing device 1 includes a controller 80, a communication interface 81, a device memory 82, a notifying portion 83, and a connector 101. The controller 80, communication interface 81 and device memory 82 are provided in the housing 11 of the printing device 1. The notifying portion 83 is electrically connected to the controller 80. The connector 101 is connected to the housing 11 of the printing device 1.

The controller 80 includes, for example, an ASIC (Application Specific Integrated Circuit). The controller 80 is electrically connected to the device memory 82 and the communication interface 81. The controller 80 is configured to execute various operations to make the printing device 1 perform various types of printing-related processing.

The controller 80 may also include a processor such as a CPU (Central Processing Unit). In this case, a control program may be stored in the device memory 82 for implementing various control operations on the printing device 1, and the processor may operate according to the control program to allow the controller 80 to make the printing device 1 perform various types of processing.

The controller 80 may also include a computer-readable storage medium that stores the control program. As the storage medium, the controller 80 may include the device memory 82, or a "non-transitory tangible medium" such as a ROM (Read Only Memory), a tape, a disk, a card, a semiconductor memory, or a programmable logic circuit. The controller 80 may also include a RAM (Random Access Memory) to expand the control program therein. Still alternatively, the control program may be supplied to the controller 80 through any transmission medium (e.g., a communication network or a broadcast wave) capable of transmitting the control program. An aspect of the present disclosure may be implemented in a form of a data signal embedded in a carrier wave, through which the control program is embodied according to electrical transmission.

Upon attachment of the ink cartridge 4 to the housing 11 of the printing device 1, the connector 101 is electrically connected to the cartridge memory 42 of the ink cartridge 4, as illustrated in FIG. 1A. The controller 80 of the printing device 1 is thus electrically connected to the cartridge memory 42 of the attached ink cartridge 4. Since the communication between the controller 80 and the cartridge memory 42 is established in this way, the controller 80 can execute information reading and writing processing (including rewriting processing) from/to the cartridge memory 42.

The device memory 82 is a memory from/to which information can be read/written. The device memory 82 is, for example, a flash ROM (Read Only Memory) or an EEPROM®. In the present embodiment, the device memory 82 has seven regions 821-827.

The region 821 stores cartridge information. The cartridge information is information on the ink cartridge 4 of one of four colors attached to the housing 11 of the printing device 1. Specifically, the cartridge information includes information associated with the respective ink cartridges 4, namely, the cartridge ID, the cartridge type, and the ink residual amount which are read out from the cartridge memory 42 of each ink cartridge 4. In the present embodiment, the controller 80 refers to the cartridge information in order to determine whether the printing device 1 should undergo a transition to a contract mode depending on the attachment status of the ink cartridge 4 in the printing device 1. Here, the contract mode is one of operation modes of the printing device 1. In the contract mode, the printing device 1 is registered as a contract-covered device eligible to execute the contract-based flat-rate printing. The cartridge information that the controller 80 refers to will be described in detail later with reference to FIG. 3.

The region 822 stores a device ID. The device ID is identification information for identifying the printing device 1. The device ID is, for example, a serial number of the printing device 1.

The region 823 stores mode information. The mode information is information indicating the operation mode of the printing device 1. In the present embodiment, the mode information includes two modes: the "contract mode" and a "non-contract mode". The "contract mode" represents a mode in which the printing device 1 operates on the printing system 100 as a contract-covered device. The "non-contract mode" represents a mode in which the printing device 1 is not designated as a contract-covered device and simply operates as an ordinary printer.

At the time of shipment of the printing device 1, the region 823 stores, by default, a value corresponding to the non-contract mode. The server 9 transmits a request including an instruction to transit to the contract mode to the printing device 1 of the contracted user. According to the request from the server 9, the controller 80 of the printing device 1 changes the value of the region 823 from the one corresponding to the non-contract mode to another value corresponding to the contract mode. In the present embodiment, the controller 80's changing the value of the region 823 to the value corresponding to the contract mode is referred to as "transition to the contract mode".

Incidentally, according to another embodiment, the mode information may further include information indicative of whether the printing device 1 in the contract mode is in a charge state or in a non-charged state, in addition to the information as to whether the printing device 1 is in the contract mode or in the non-contract mode. That is, in this case, the region 823 may store information indicative of which operation mode the printing device 1 is in from among the following three types: (1) the non-contract mode, (2) the non-charged state in the contract mode, and (3) the charged state in the contract mode.

Here, the "non-charged state in the contract mode" denotes a state where the printing device 1 is in the contract mode, but the flat-rate printing service has not been utilized yet. This "non-charged state in the contract mode" may occur, for example, when the timing at which the server 9 recognizes the printing device 1 as a contract-covered device is different from the timing at which the server 9 recognizes use of the flat-rate printing service has been stated in the printing device 1, as described above.

The "charged state in the contract mode" denotes a state where the printing device 1 is in the contract mode, and the flat-rate printing service has been started to be used in the printing device 1. Hereinafter, the "charged state in the contract mode" will be also referred to as a flat-rate printing state.

The region 824 stores a communication status. The communication status is information indicative of a communication state between the printing device 1 and the server 9. For example, the communication status may be information indicative of whether the printing device 1 is on line or off line. In a case where the printing device 1 can communicate with an external apparatus by connection of the communication interface 81 with a communication network, a value indicating that the printing device 1 is on line is stored in the region 824 as the communication status. On the other hand, in a case where the printing device 1 cannot communicate with an external apparatus due to disconnection of the communication interface 81 from a communication network, a value indicating that the printing device 1 is off line is stored in the region 824 as the communication status.

Alternatively, the controller 80 may be configured to monitor the communication state of the printing device 1 with the server 9 through the communication interface 81 according to a known communication protocol. In this case, the controller 80 may further store, in the region 824, a value indicative of a state where the printing device 1 cannot communicate with the server 9 due to some kind of trouble on the side of the server 9, in addition to the values indicative of the on line and off-line described above.

The region 825 stores a determination table. The determination table is a look-up table to be referred to by the controller 80 for determination of whether the printing device 1 should perform the transition to the contract mode depending on errors that may be occurring in the printing device 1. An exemplary data structure of the determination table will be described in greater detail later with reference to FIG. 4.

The region 826 stores a first page count. The first page count indicates a cumulative number of printed pages in the printing device 1.

The region 827 stores a second page count. The second page count indicates the number of pages printed using the flat-rate printing service in the printing device 1. The second page count may be reset to 0 every time the printing device 1 is switched from the non-contract mode to the contract mode; or may indicate a cumulative number of pages printed using the flat-rate printing service in the printing device 1 from the beginning of use of the printing device 1. Hereinafter, unless otherwise specified, the second page count is assumed to indicate the cumulative number of printed pages in the flat-rate printing.

Incidentally, the device memory 82 may further have another region for storing a cumulative number of printed pages in the non-contract mode of the printing device 1.

The communication interface 81 enables communication between the printing device 1 and the server 9 over a communication network (not illustrated) such as Internet. The communication interface 81 outputs a request received from the server 9 to the controller 80. Here, the "request" includes various requests, instructions, and inquiries transmitted from the server 9 in the contract-related processing. In return, the communication interface 81 transmits, to the server 9, a result (as a "response") that is calculated and outputted by the controller 80 in response to the request. In the present embodiment, the return of the response through the communication interface 81 may be omitted.

For example, if an instruction to change various settings in the printing device 1 is transmitted as the "request" from the server 9, the controller 80 may change the various settings in the printing device 1 following the instruction. In this case, a notification to inform that the settings have been changed in the printing device 1 may not necessarily be returned to the server 9 through the communication interface 81.

Server 9

The server 9 includes a server communication portion 91, a server memory 92, and a server controller 93.

The server communication portion 91 serves as a communication interface for performing communication between the server 9 and the printing device 1. The server communication portion 91 transmits a "request" inputted from the server controller 93 to the printing device 1. The server communication portion 91 also receives a "response" transmitted from the printing device 1 in response to the transmitted request, and outputs the response to the server controller 93.

The server communication portion 91 can also communicate with a user terminal under the care of the user of the printing device 1, so that information exchange can be performed between the server communication portion 91 and the user terminal in response to the user's operations on the user terminal. In the present embodiment, the server communication portion 91 exchanges various information required for concluding a contract. Specifically, the server communication portion 91 may receive a contract request message for requesting to make a contract from the user terminal. The contract request message may include the device ID for identifying the printing device 1. After the server controller 93 executes the contract-related processing in response to the contract request message, the server communication portion 91 may transmit, to the user terminal, a notification indicating that the printing device 1 is now registered as a contract-covered device.

The server memory 92 is a storage device for storing data required for operations of the server 9. The server memory 92 has a region 921 that stores device information for each one of the printing devices 1. The device information is data summarizing various types of information on the printing device 1. The device information is created for each one of the printing devices 1. Specifically, the device information may include, for example, a device ID, a contract flag, and an upper limit number of printable pages under contract. Further, the device information may also include a model number and a manufacturing date of the printing device 1, for example.

The device ID is identification information necessary for the server 9 to uniquely identify each one of the printing devices 1. The contract flag is information indicative of whether the printing device 1 has entered the contract mode, i.e., whether the printing device 1 has been registered as a contract-covered device. The upper limit number of printable pages under contract indicates an upper limit in the number of printable pages under the flat-rate printing within a prescribed time period under the contract.

The server controller 93 is a CPU that provides overall control over the server 9. The server controller 93 creates a "request" for the printing device 1 at a prescribed timing, and outputs the created request to the server communication portion 91. In the present embodiment, the "request" includes, for example, a transition command instructing the printing device 1 to perform transition to the contract mode. In response to receiving the contract request message from the user terminal, the server controller 93 controls the server communication portion 91 to transmit the transition command to the printing device 1 specified by the user.

Further, based on the response received from the printing device 1 through the server communication portion 91, the server controller 93 stores the device information in the region 921 of the server memory 92 and updates the device information that has been already stored therein.

More specifically, for example, when the server communication portion 91 receives from the user terminal a contract request message on the printing device 1 for which the user desires to newly subscribe to the flat-rate printing service, the server controller 93 newly registers the device information of this printing device 1 in the region 921. At this time, the server controller 93 sets a value meaning "incomplete" as a default value for the contract flag. The contract flag "incomplete" signifies that the server 9 has not yet confirmed the printing device 1, which is scheduled to execute the flat-rate printing, has transitioned to the contract mode after the contract is concluded between the user and the provider. After confirming that the printing device 1 has transitioned to the contract mode through communication with the printing device 1, the server controller 93 updates the value of the contract flag for the printing device 1 to a value meaning "completed". Through this processing, the printing device 1 is registered as a contract-covered device on the printing system 100 including the server 9.

<Overall Flow in the Printing System 100>

Figure 2:
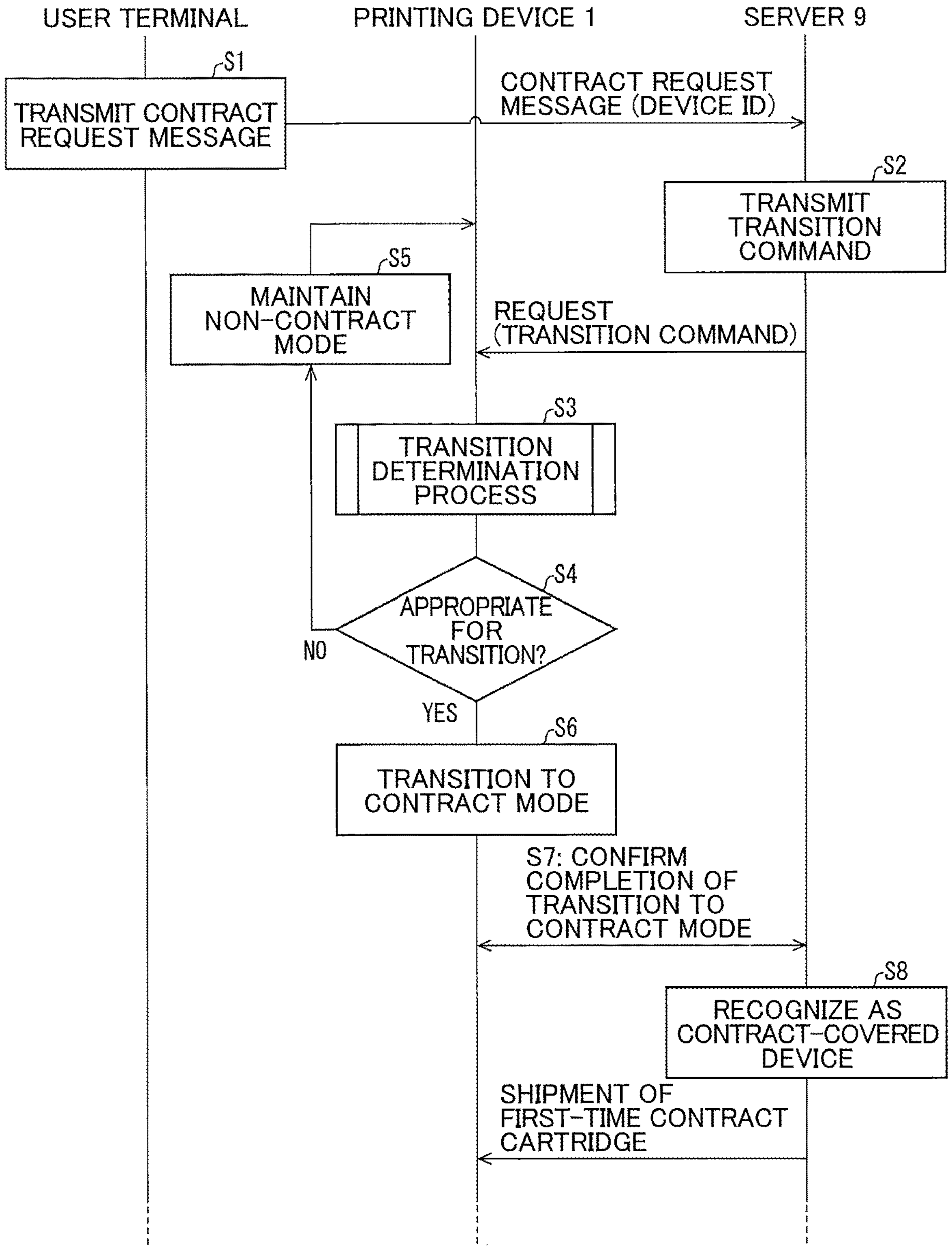
FIG. 2 is a sequence diagram illustrating a flow of processing to be executed in the printing system 100 according to the first embodiment.

FIG. 2 is a sequence diagram illustrating the flow of processing to be executed in the printing system 100 according to the first embodiment.

In step S1, the user terminal (not illustrated) transmits a contract request message to the server 9 according to user's inputs. The contract request message includes the device ID for identifying the printing device 1 with which the user desires to execute the flat-rate printing service. The contract request message is received by the server communication portion 91 of the server 9.

In step S2, in response to receiving the contract request message, the server controller 93 of the server 9 transmits a "request" to the printing device 1. This request includes the transition command instructing the transition of the printing device 1 to the contract mode. At this timing, the server controller 93 may register the received device information of the printing device 1 in the server memory 92.

In step S3, in response to receiving the transition command, the controller 80 of the printing device 1 executes determination process to determine whether to perform the transition to the contract mode. Specifically, the determination process is processing to determine whether the printing device 1 is in a suitable condition for transition to the contract mode. For example, in the determination process, whether to perform the transition to the contract mode is determined based on the attachment state of the ink cartridge 4 which is an expendable supply to be consumed in the printing operations in the printing device 1. Here, the attachment state may refer to: whether the ink cartridge 4 is attached to the printing device 1; how much ink is left in the attached ink cartridge 4; and the type of the attached ink cartridge 4, for example.

In step S4, the controller 80 refers to a result of the determination obtained in the determination process of step S3. When the determination result indicates "inappropriate" (S4: NO), the controller 80 advances to a step S5 to maintain the non-contract mode set in the printing device 1 as the operation mode therefor, contrary to the transition command received in step S2.

When the determination result obtained in the determination process of step S3 indicates "appropriate" (S4: YES), the controller 80 advances to step S6 to switch the operation mode of the printing device 1 to the contract mode from the non-contract mode, in accordance with the transition command received in step S2. Specifically, the controller 80 changes the mode information stored in the region 823 from the non-contract mode to the contract mode.

Subsequently, in step S7, the printing device 1 and the server 9 may communicate with each other at an appropriate timing to confirm completion of the transition of the printing device 1 to the contract mode. For example, the server controller 93 may transmit a request inquiring about success/failure of the transition to the contract mode in the printing device 1 after elapse of a predetermined time from the transmission of the transition command in step S2. In response to the request, the controller 80 of the printing device 1 may return, to the server 9, a response indicating success/failure of the transition. The above transactions may be periodically repeated until the server 9 confirms that "the transition to the contract mode is completed" in the printing device 1.

Alternatively, the controller 80 may actively notify the server 9 of the success/failure of the transition even in absence of the inquiry request from the server 9. For example, after completion of step S5, the controller 80 may send a response to the server 9 to notify that the non-contract mode has been maintained in the printing device 1 against the transition command. Upon receipt of the response from the controller 80, the server 9 may send a message, to the user terminal, to notify the failure of the transition to the contract mode in the printing device 1. Alternatively, the controller 80 may transmit, to the user terminal, a notification indicative of the failure of the transition in the printing device 1 through the communication interface 81. Further, at this time, the controller 80 may also transmit a reason why the non-contract mode has been maintained in the printing device 1, to the user terminal or to the server 9. Still further, after completion of step S5, the controller 80 may also notify, to the user of the printing device 1, that the transition to the contract mode has failed in the printing device 1 through the notifying portion 83. Here, the notification through the notifying portion 83 may be: an error message on a display; a beep sound; or illumination of a lamp, for example.

On the other hand, after completion of step S6, the controller 80 may return, as a response to the server 9, a notification indicating that the operation mode has transitioned from the non-contract mode to the contract mode following the to the transition command. The controller 80 may also transmit, to the user terminal, a notification to notify the success of the transition in the printing device 1.

Subsequently, in step S8, the server controller 93 recognizes the printing device 1 as a contract-covered device based on a fact that the server communication portion 91 acquires, from the printing device 1, the information indicating that the printing device 1 has transitioned to the contract mode.

Incidentally, after step S8, the server 9 may determine to deliver, to the user of the printing device 1, a set of contract cartridges for use in the printing device 1 that has now been newly registered as a contract-covered device. These contract cartridges to be used in the printing device 1 for the first time under the contract is referred to as "first-time contract cartridges".

Incidentally, in the printing system 100, the server 9 may be constituted of an information management server and a delivery management server. The information management server may function to manage customer information with respect to the user and his or her printing device 1. The delivery management server may function to manage delivery of the contract cartridges based on the customer information. In this modification, the information management server recognizes (registers) the printing device 1 as a contract-covered device in step S8, and then instructs the delivery management server to deliver the first-time contract cartridges to the address of the user of the printing device 1. Pursuant to the instruction from the information management server, the delivery management server proceeds to shipping of the first-time contract cartridges. The set of first-time contract cartridges is thus delivered to the user.

<Data Structures>

Cartridge Information

FIG. 3 is a view illustrating examples of the cartridge information stored in the region 821. The cartridge information of this example has a data structure configured of a column of the cartridge ID, a column of the cartridge type, and a column of the ink residual amount for each row corresponding to one of the four colors of ink stored in the respective ink cartridges 4.

The controller 80 reads out the cartridge information from the region 821 to grasp the attachment states of the respective ink cartridges 4 in the printing device 1. By referring to the attachment states of the respective ink cartridges 4 obtained in this way, the controller 80 can determine whether the printing device 1 is ready to perform the transition to the contract mode in the determination process of step 3.

In the example of FIG. 3, a value indicative of "No Cartridge" is stored in each column for the row of cyan. Hence, the controller 80 can determine that the ink cartridge 4 for the color of cyan is not attached to the printing device 1. Further, in the example of FIG. 3, in the cartridge type column, values indicative of "commercial", "commercial", and "contract" are stored respectively for the colors of black, magenta, and yellow. From these values, the controller 80 can determine that the ink cartridges 4 of the colors of black and magenta currently attached to the printing device 1 are commercial cartridges, whereas the ink cartridge 4 for the color of yellow is the contract cartridge. Further, the controller 80 can determine the amounts of ink left in the respective ink cartridges 4 of the four colors by referring to the ink residual amount column.

Determination Table

FIG. 4 is a view illustrating an example of the determination table stored in the region 825. As described above, the determination table is a look-up table that is to be referred to by the controller 80 for determination on whether the transition to the contract mode should be made in the printing device 1. In the example of FIG. 4, the determination table has, for each of possible errors that may occur in the printing device 1, a column indicative of an error identifier, a column indicative of transition appropriateness/inappropriateness, and a column indicative of an error type.

Incidentally, in a case where the controller 80 is configured to determine whether or not the transition should be made based on every error, rather than based on the error type, the error type column may be omitted.

The error identifier column stores a name for identifying an event that is recognized as an error in the printing device 1. For example, an error name "Memory Full Error" indicates that there is little memory space left in the device memory 82 so that normal operations cannot be performed in the controller 80. An error name "Document Jam" indicates there is a paper jam error.

The transition appropriateness/inappropriateness column stores information indicative of whether the transition to the contact mode should be made when an error is occurring in the printing device 1. Referring to the determination table of FIG. 4, the controller 80 can determine that the transition to the contract mode should NOT be performed (inappropriate) when the "Memory Full Error" is occurring. On the other hand, the controller 80 can determine that the transition to the contract mode is allowed (appropriate) when the "Document Jam" is occurring.

The error type column stores an error type for classifying the possible errors based on natures thereof. In the present embodiment, the errors defined as being likely to occur in the printing device 1 (the errors in the error identifier column) are classified into three types, namely, "type A", "type B" and "type C". Specifically, the error belonging to the "type A" is an error that may involve power-off to eliminate the error. The error belonging to "type B" is an error that could involve forced shut-down of the operations of the controller 80 while the error is occurring. The error belonging to the "type C" is an error that does not fall into any of the above-identified categories (i.e., those errors belonging to neither type A nor type B).

The errors belonging to the "type A and "type B" may possibly obstruct the contract-related processing to be executed between the printing device 1 and the server 9 during a contract procedure period. Here, the contract procedure period is a period during which the printing device 1 and the server 9 execute the contract-related processing in cooperation with each other. Specifically, the contract procedure period is a time span staring from a timing when the printing device 1 has entered the contract mode (S6 in FIG. 2) to a timing when the server 9 recognizes the printing device 1 as a contract-covered device (S8 in FIG. 2). Thus, in the determination table, the errors belonging to the "type A" and "type B" are associated with information indicative of "inappropriate" for the transition to the contract mode. With this configuration, the controller 80 can determine that the printing device 1 should NOT be switched to the contract mode as long as any one of the errors belonging to the "type A" and "type B" is occurring in the printing device 1.

<Determination Process>

Figure 5:
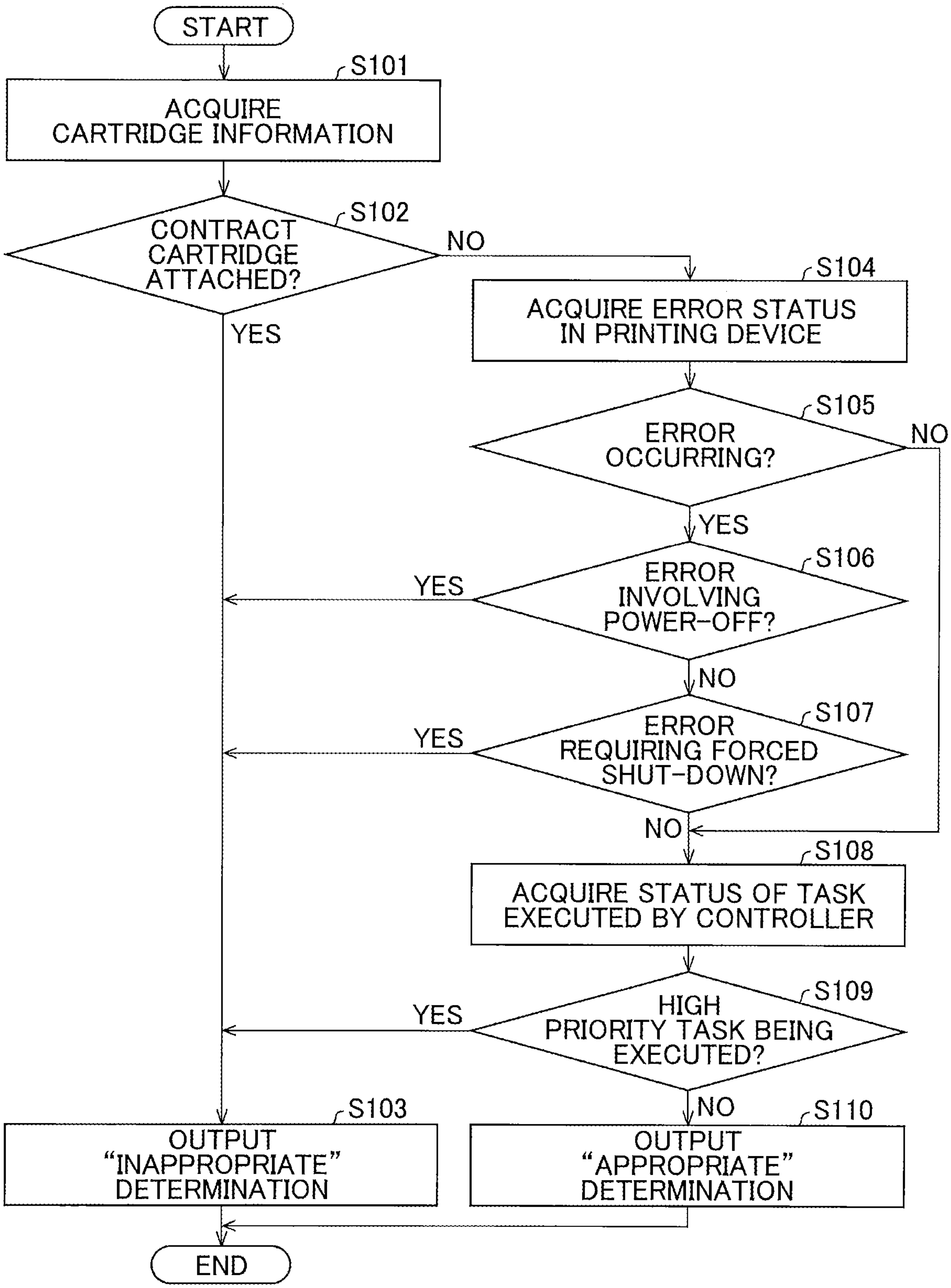
FIG. 5 is a flowchart illustrating an example of steps in determination process executed by a controller 80 of the printing device 1 according to the first embodiment.

FIG. 5 is a flowchart illustrating steps in the determination process executed by the controller 80. The determination process of FIG. 5 corresponds to step S3 in FIG. 2. A series of processing illustrated in FIG. 5 is configured to be initiated in response to receipt of the transition command to the contract mode from the server 9.

In step S101, the controller 80 reads out the cartridge information (as illustrated in FIG. 3) from the region 821 of the device memory 82.

In step S102, the controller 80 checks whether the contract cartridge has been attached to the printing device 1. In a case where any one of the contract cartridges 4 of the four colors is attached to the printing device 1, the controller 80 determines that the "contract cartridge is attached". That is, here, the controller 80 confirms that the printing device 1 is NOT in an expected abnormal situation where: the printing device 1 is in the non-contract mode and no first-time contract cartridge has not yet delivered to the printing device 1; but a contract cartridge has already been attached to the printing device 1 for some reason.

When at least one of the contract cartridges of four colors is determined to be attached to the printing device 1 in step S102 (S102: YES), the controller 80 advances to step S103. In step S103, the controller 80 determines that the transition to the contract mode should not be performed this time, and outputs a determination result indicating "inappropriate" for transition.

On the other hand, in step S102, when no contract cartridge is determined to be attached to the printing device 1 (S102: NO), the controller 80 advances to step S104. In step S104, the controller 80 acquires a status on occurrence of any error in the printing device 1. For example, the controller 80 may read out the identifier of the error which is currently occurring in the printing device 1 from a non-illustrated region of the device memory 82.

In step S105, the controller 80 determines whether any error is occurring in the printing device 1.

Specifically, the controller 80 determines that no error is occurring in the printing device 1 (S105: NO) when no error identifier is stored in the non-illustrated region in the device memory 82, and advances to step S108.

On the other hand, the controller 80 determines that an error is occurring (S105: YES) in a case where any error identifier is stored in the non-illustrated region in the device memory 82.

In step S106 and thereafter, the controller 80 may determine whether the error currently occurring in the printing device 1 is an error that may possibly interrupt the contract-related processing to be executed in the contract procedure period. Such errors that could interrupt the contract-related processing may be, for example, an error that may cease a printing operation in the printing device 1.

Alternatively, the controller 80 may check whether the error currently occurring in the printing device 1 is an error of a type that meets any of predetermined inappropriate conditions. Here, the predetermined inappropriate conditions may be contained in definition information which defines errors that are deemed inappropriate for performing the transition to the contract mode. The definition information may be stored in the device memory 82. The determination table illustrated in FIG. 4 is an example of the definition information. When the error occurring in the printing device 1 is determined to satisfy any of the predetermined inappropriate conditions, the controller 80 may advance to step S103.

More specifically, in the present embodiment, the controller 80 determines in step S106 whether the error currently occurring in the printing device 1 is of type A that involves power-off to solve the error. When the error is determined to belong to the type A (S106: YES), the controller 80 advances to step S103. That is, when the error occurring in the printing device 1 is determined to be of type A that involves power-off to eliminate the error (S106:

YES), the controller 80 determines the transition to the contract mode should not be performed (inappropriate) at this time in step S103. On the other hand, when the error does not belong to the type A (S106: NO), the controller 80 advances to step S107.

In step S107, the controller 80 determines whether the error currently occurring in the printing device 1 is of type B that could require forced termination of the operation of the controller 80 during the error. If the error is of this type B (S107: YES), the controller 80 advances to step S103. That is, if the error occurring in the printing device 1 is determined to belong to the type B that could forcibly end the operation of the controller 80 (S107: YES), the controller 80 determines the transition to the contract mode should not be performed (inappropriate) in step S103. On the other hand, if the error is not of type B (S107: NO), the controller 80 advances to step S108.

In step S108, the controller 80 acquires an execution status of a task that is currently executed in the printing device 1.

In step S109, the controller 80 determines whether the task that the printing device 1 is currently executing is a task of high priority.

Here, the high-priority task may be, for example, a task having a higher priority than mode control process (the procedure in steps S4: NO to S5 of FIG. 2). Alternatively, the high-priority task may be a task having a higher priority than completion reporting processing through which the printing device 1 makes the server 9 confirm completion of the transition to the contract mode in the printing device 1 through communications between the printing device 1 and the server 9 (i.e., the procedure in step S7 of FIG. 2). Specifically, for example, the high-priority task may be introduction processing through which ink in the ink cartridge 4 is introduced into an image-forming mechanism 13 (see FIG. 1B) provided in the housing 11 of the printing device 1. Alternatively, the high-priority task may be update processing for updating the program for operating the controller 80 in the printing device 1.

When the high-priority task is currently being executed (S109: YES), the controller 80 advances to step S103. That is, when the printing device 1 is determined to be executing a task whose priority is higher than that of the mode control process (in steps S4: NO to S5 of FIG. 2), the controller 80 determines the transition to the contract mode should not be performed (inappropriate) at this time in step S103. On the other hand, when a high-priority task is not being executed (S109: NO), the controller 80 advances to step S110.

In step S110, the controller 80 determines that the transition to the contract mode now is allowed, and outputs a determination result indicative of “appropriate” for the transition.

<Technical Advantages of the First Embodiment>

As described above, according to the method for controlling the printing device 1 according to the first embodiment, the controller 80 of the printing device 1 at least refers to the cartridge information stored in the region 821 upon receiving an instruction to enter the contract mode (transition command) from the server 9. Then, the controller 80 determines that the transition to the contract mode is appropriate when no contract cartridge is attached to the housing 11 of the printing device 1. The controller 80 further confirms whether there is any error that could interrupt the contract-related processing (steps S4 through S7 in FIG. 2). When no such error is found to be occurring, the controller 80 determines the printing device 1 is in a suitable situation to perform the transition to the contract mode. Still further, the controller 80 checks whether the controller 80 itself is executing a task having a higher priority than the contract-related processing. The controller 80 determines that the printing device 1 is ready to perform the transition to the contract mode (appropriate) when no task of high priority is being executed.

With this configuration, the contract-related processing required for the printing device 1 to be registered as a contract-covered device is configured NOT to be executed between the printing device 1 and the server 9 unless the execution of the contract-related processing is deemed desirable in the printing device 1. As a result, in the printing system 100 of the first embodiment, the printing device 1 is allowed to execute necessary settings for implementing the flat-rate printing service at an appropriate timing.

<Modifications to the First Embodiment>

For example, in the above-described first embodiment, the following three conditions (1)-(3) are all used in the determination process to determine whether to perform the transition to the contract mode:

(1) the attachment state of the ink cartridge 4 (in steps S101 and S102);

(2) the error status (in steps S104 through S107); and (3) the execution state of a high-priority task (in steps S108 and S109).

However, in the printing device 1, the controller 80 may employ only one or two of the three conditions (1)-(3) in executing the determination process.

In the printing system 100 of the disclosure, the service provider may offer a plurality of different types of flat-rate printing services to users.

In the printing system 100 according to this modification, the server 9 may retain a determination table, for each of the different types of the flat-rate printing services provided by the provider, to determine whether the transition to the contract mode should be carried out. Further, the server 9 may also supply, to the printing device 1, a determination table corresponding to the type of the flat-rate printing service designated by the printing device 1, when transmitting the transition command to the printing device 1 in step S2 of FIG. 2.

In step S3, the controller 80 of the printing device 1 may determine whether or not the printing device 1 is in a suitable condition for the transition to the contract mode based on the determination table supplied from the server 9. Specifically, when the current state of the printing device 1 meets any of the conditions defined in the supplied determination table, the controller 80 determines in step S4 that the printing device 1 is currently “inappropriate” for the transition (S4: NO) and maintains the non-contract mode against the transition command in step S5.

More specifically, to facilitate understanding, assume that two kinds of flat-rate printing services A and B are now available in the printing system 100. Under the flat-rate printing service A, the printing device 1 is allowed to only use the printing function with a fixed charge. Under the flat-rate printing service B, the printing device 1 is allowed to also utilize a reader function (such as a scanner function) in addition to the printing function. In a case where the printing device 1 is signed up for the flat-rate printing service A, a determination table A is supplied to the printing device 1 from the server 9. Here, the determination table A may stipulate the following rules. The printing device 1 is determined as being “appropriate” for the transition as long as any error relating to reading operations of a reader is occurring. On the other hand, the printing device 1 is determined as being “inappropriate” for the transition when any error relating to printing operations is occurring. Accordingly, the controller 80 can provide control over the printing device 1 in accordance with the determination table A such that: the transition to the contract mode is to be executed when the error currently occurring in the printing device 1 relates to the reading operation; and the transition to the contract mode is NOT to be executed when the current error relates to the printing operations.

In a case where the printing device 1 is signed up for the flat-rate printing service B, a determination table B is supplied to the printing device 1 from the server 9. Accordingly, in accordance with the determination table B, the controller 80 can provide control over the printing device 1 such that the transition to the contract mode is NOT to be executed when the printing device 1 is experiencing an error relating to either one of the reading operation and the reading operation.

According to the printing system 100 according to this modification, the provider can flexibly set conditions considered to be inappropriate for executing the transition to the contract mode according to the type of the service provided by the service provider, thereby realizing an enhanced degree of freedom in design of the printing system 100.

2. Second Embodiment

<Agenda>

In the first embodiment, the process for the printing device 1 being registered as a contract-covered device is designed to be executed at an appropriate timing. As described in the first embodiment, in a flat-rate printing service, the timing at which the server 9 recognizes the printing device 1 as a contract-covered device and the timing at which the server 9 recognizes that the printing device 1 has started using the flat-rate printing service may differ from each other. When the above two timings differ from each other, both the printing device 1 and server 9 need to recognize that "use of the flat-rate printing service has started" at an appropriate timing.

For example, here, assume that a flat-rate printing service adopts such a fee structure that a service charge increases in proportion to a period for using the service. Under this fee structure, conceivably, if the billing for the fixed-rate printing service is started at the same timing as when the server 9 recognizes the printing device 1 as a contract-covered device, the billing may be started involuntarily even though the user has not yet actually started using (or cannot start using) the fixed-rate printing service. Such a mismatch would force the user to pay more than he needs to for his actual period of use, which is disadvantageous for the user. Further, if the user starts using the fixed-rate printing before the server 9 recognizes that the printing device 1 starts using the fixed-rate printing, the start date of the charging for the fixed-rate printing on the server 9 may be delayed than the actual start date on the printing device 1, which is disadvantageous for the provider.

In view of the foregoing, it is an object to a second embodiment of the disclosure to provide a printing system where provision of the fixed-rate printing service can be started at an appropriate timing. As a matter of convenience, those parts and configurations which function in the same way as those in the first embodiment will be designated by the same reference numerals with those in the first embodiment, and descriptions therefor will be omitted hereinafter.

<Essential Configurations>

Figure 6:
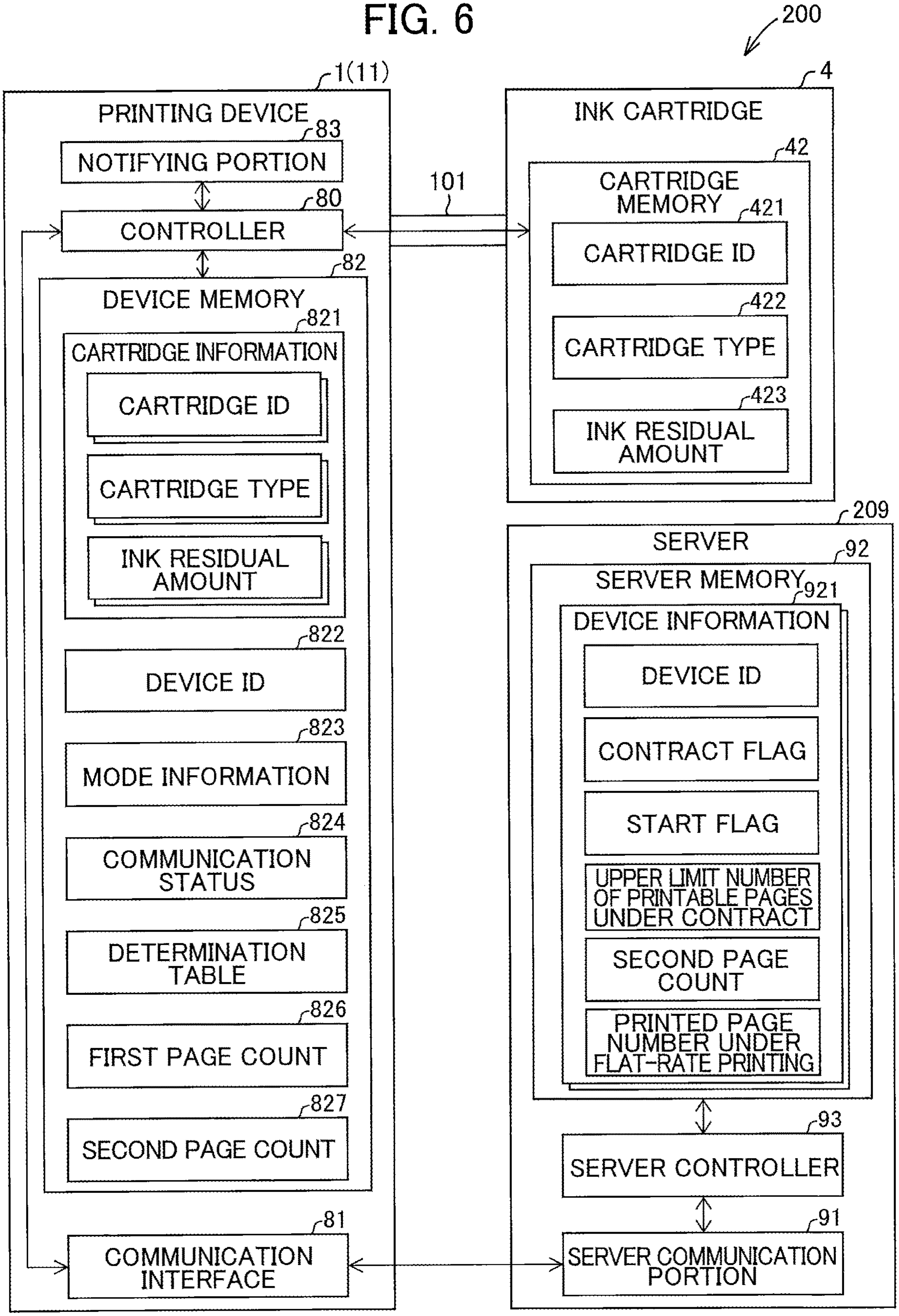
FIG. 6 is a block diagram illustrating essential configurations of a printing device 1, the ink cartridge 4, and a server 209 included in a printing system 200 according to a second embodiment of the disclosure.

FIG. 6 is a block diagram illustrating essential configurations of the printing device 1, the ink cartridge 4, and a server 209 included in a printing system 200 according to the second embodiment.

In the printing system 200 according to the second embodiment, the controller 80 of the printing device 1 is configured to execute communication-status monitoring process for monitoring a communication state between the printing device 1 and the server 209. This communication-status monitoring process may be periodically executed as long as the printing device 1 is powered, independent of whether other processing may be performed in the printing device 1. In the communication-status monitoring process, the controller 80 identifies the communication state between the printing device 1 and the server 209, stores information indicative of the communication state in the region 824 of the device memory 82 as the communication status.

In the server 209 according to the second embodiment, the device information, which is stored in the region 921 of the server memory 92, further includes a start flag, a second page count, and a printed page number under flat-rate printing, in addition to the device ID, the contact flag, and the upper limit number of printable pages under contract.

The start flag is information indicative of whether the flat-rate printing service has been started in the printing device 1. In the present embodiment, the start flag also signifies whether the billing for the printing device 1 has been started. As an initial value, a value indicating "not-yet" is set for the start flag. The start flag "not-yet" signifies that the flat-rate printing service has not been started yet in the printing device 1.

Upon receiving a notification indicating that the flat-rate printing service has started in the printing device 1 from the controller 80 of the printing device 1, the server controller 93 of the server 209 changes the value of the start flag from that indicative of "not-yet" to that indicative of "done". The start flag "done" signifies that the flat-rate printing service has started in the printing device 1.

The second page count is information identical to the information stored in the second page count 827 of the printing device 1.

The printed page number under flat-rate printing is information indicating the cumulative number of pages printed using the flat-rate printing service since the start of the flat-rate printing service in the printing device 1. Incidentally, if the user of the printing device 1 cancelled the contract and then concludes another new contract again, the printed page number under flat-rate printing is counted based on the newly-concluded contract to indicate the number of printed pages using the flat-rate printing service from the start date of the flat-rate printing service in the new contract.

The server controller 93 of the server 209 updates the values of the second page count and the printed page number under flat-rate printing stored in the region 921 of the server memory 92, in response to a notification from the controller 80 of the printing device 1. Details on updates of these values will be described later.

<Overall Flow>

Figure 7:
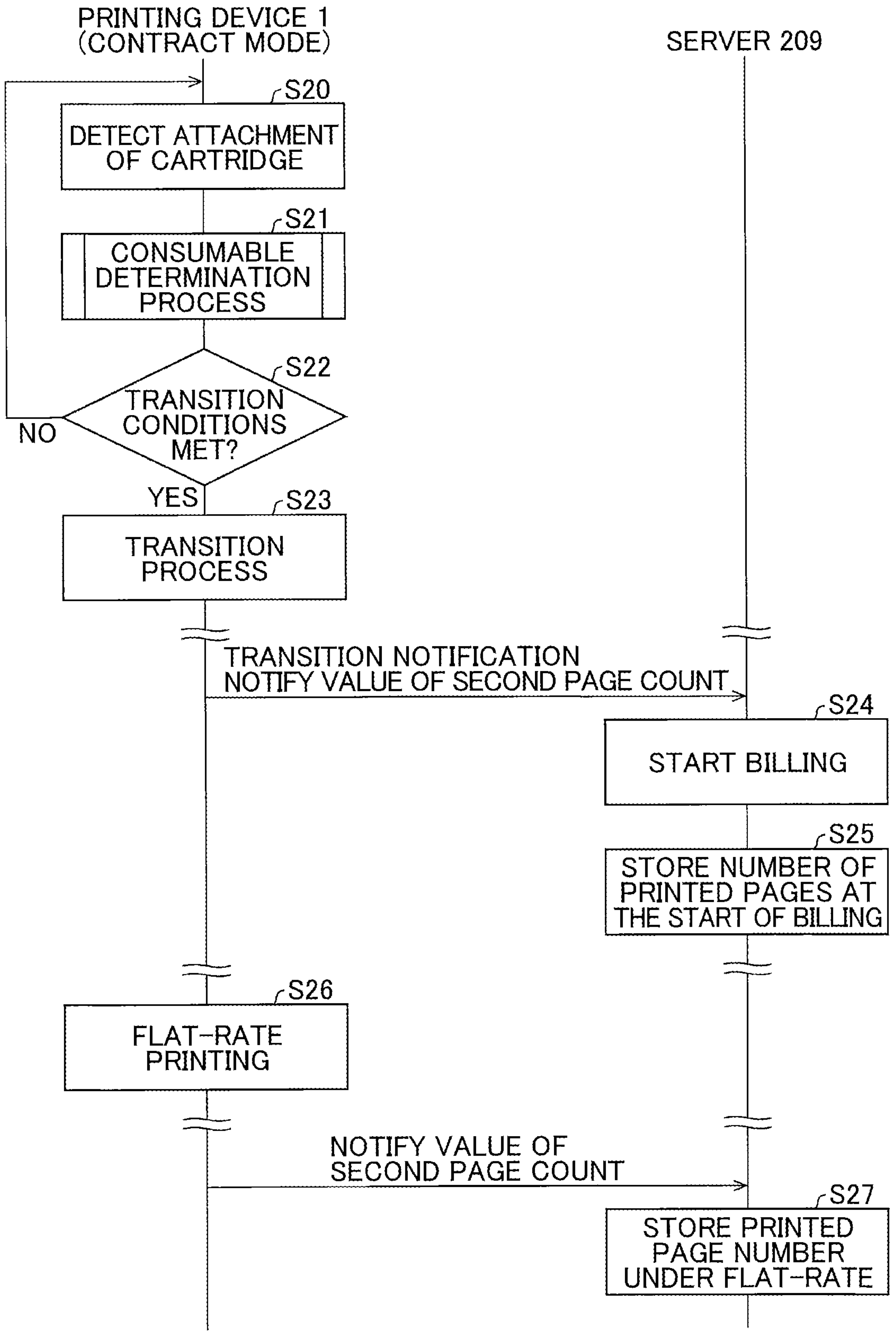
FIG. 7 is a sequence diagram illustrating a flow of processing to be executed in the printing system 200 according to the second embodiment.

FIG. 7 is a sequence diagram illustrating steps in processing executed in the printing system 200. Here, FIG. 7 illustrates the flow of processing performed in the printing device 1 and the server 9, after completion of the processing illustrated in FIG. 2 in the printing system 200. That is, the printing device 1 in the printing system 200 is assumed to have entered the contract mode in step S6 of FIG. 2.

Referring to FIG. 7, in step S20, the controller 80 of the printing device 1 detects attachment of a cartridge of some kind to the printing device 1 (detection processing). For example, after completion of step S8 of FIG. 2, a first-time contract cartridge is delivered to the user. When the user attaches the received first-time contract cartridge to the printing device 1, the controller 80 detects the attachment of the first-time contract cartridge.

How to detect attachment of a cartridge to the printing device 1 may be determined as appropriate in consideration of specifications of a hardware or a software of the printing device 1.

For example, the controller 80 may be configured to detect that a cartridge is attached to the housing 11 of the printing device 1 through an opening 12 formed in the housing 11 of the printing device 1. With this structure, upon attachment of the cartridge to the housing 11, the printing device 1 can determine without delay whether the attached cartridge is suitable or appropriate for the flat-rate printing.

Alternatively, the controller 80 may detect attachment of a cartridge to the housing 11 when detecting contact of the attached cartridge with the housing 11. Such contact of the cartridge with the housing 11 may be detected, for example, using a sensor or by means of a mechanical mechanism.

Still alternatively, the controller 80 may determine that a cartridge is attached to the housing 11 upon detection of a user's operation required for attachment of the cartridge to the housing 11. For example, assume a case where the printing device 1 includes a cover 14 for opening/closing the opening 12 of the housing 11, as illustrated in FIG. 1B. In this case, the controller 80 may be configured to detect movements of the cover 14, for example, using a sensor or through a mechanical mechanism. The controller 80 may determine that a cartridge is attached to the housing 11 when detecting that the cover 14 is closed relative to the housing 11. In this way, the printing device 1 can determine whether the attached cartridge is of a particular type at such a timing that the user closes the cover 14 (to close off the housing 11) after attachment of the cartridge to the housing 11. Thus, the printing device 1 can determine without delay whether the attached cartridge is suitable (appropriate) for the flat-rate printing.

In step S21, the controller 80 executes consumable determination process. The consumable determination process is processing to determine whether a cartridge of a particular type is included in the one or more cartridges attached to the housing 11 of the printing device 1. Here, the "cartridge of a particular type" is a cartridge that satisfies a prescribed condition(s) deemed suitable for transition to the flat-rate printing (flat-rate printing state). Specifically, in the present embodiment, the "cartridge of a particular type" refers to the contract cartridge.

Figure 8:
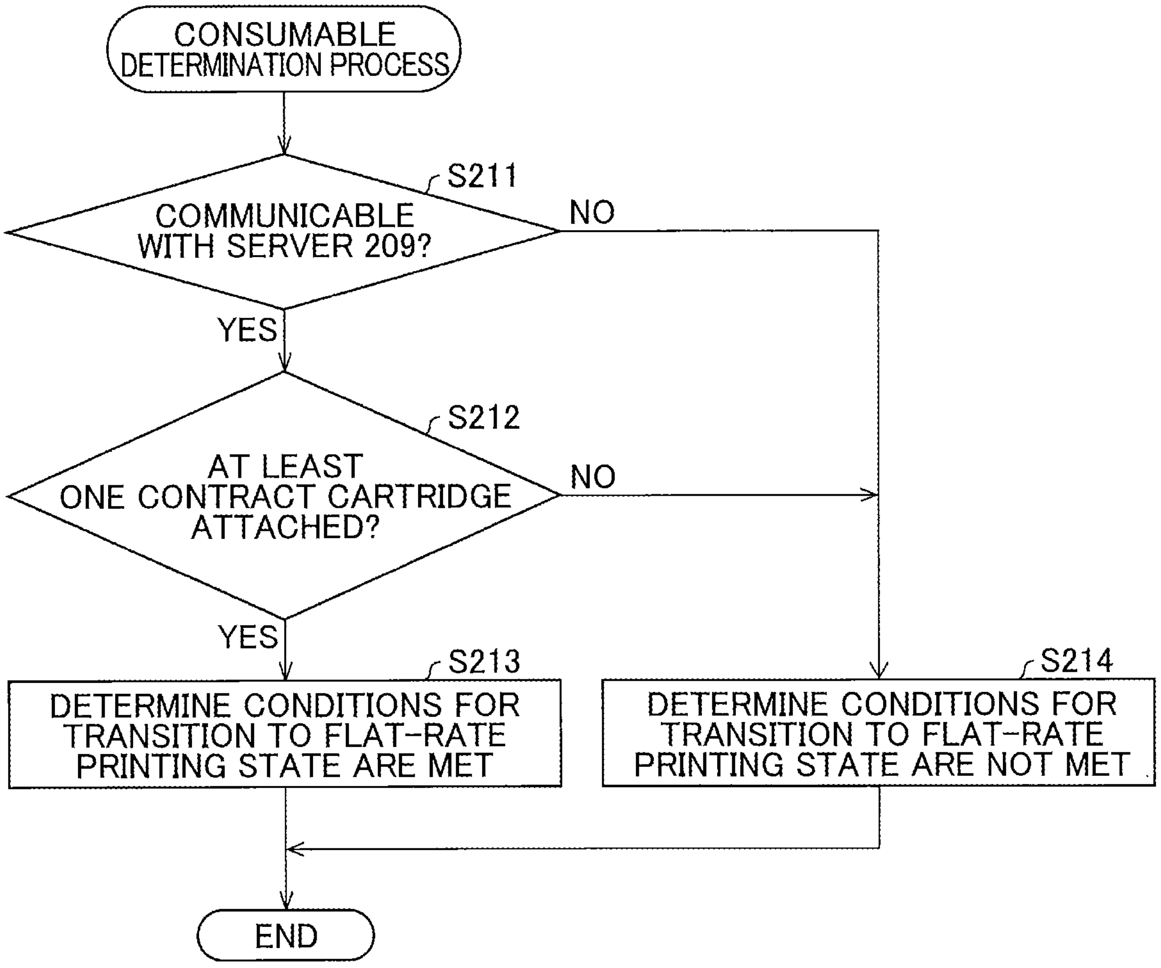
FIG. 8 is a flowchart illustrating steps in a consumable determination process executed during the processing of FIG. 7.

More specifically, a flowchart of FIG. 8 illustrates the flow of the consumable determination process to be executed in step S21 by the controller 80.

As described above, in the second embodiment, the controller 80 of the printing device 1 is configured to periodically execute the communication-status monitoring process. In step S211, the controller 80 determines whether the printing device 1 can communicate with the server 209. For example, the controller 80 can identify the communication state between the printing device 1 and the server 209 by referring to the information on the communication status stored in the region 824 of the device memory 82.

When the printing device 1 and the server 209 are determined to be communicable with each other (S211: YES), the controller 80 advances to step S212.

In step S212, the controller 80 determines whether at least one (or more than one) contract cartridge has been attached to the printing device 1. When at least one contract cartridge is determined to be attached to the printing device 1 (S212: YES), the controller 80 advances to step S213.

In step S213, the controller 80 determines that the conditions necessary for the transition to the flat-rate printing state are met in the printing device 1. That is, the printing device 1 is determined to be ready for the transition to the flat-rate printing.

On the other hand, in step S211, when the printing device 1 and the server 9 are determined to be unable to communicate with each other (S211: NO), the controller 80 advances to step S214. The controller 80 also advances to step S214 when no contract cartridge is determined to be attached to the printing device 1 in step S212 (S212: NO).

In step S214, the controller 80 determines that the conditions necessary for the transition to the flat-rate printing state are not met in the printing device 1. That is, the printing device 1 is not ready for the transition to the flat-rate printing.

Referring back to the flowchart of FIG. 7, in step S22, the controller 80 executes processing as appropriate in accordance with the result of the consumable determination process executed in step S21.

Specifically, in step S22, when the prescribed conditions necessary for the transition to the flat-rate printing state are determined to be met in the printing device 1 (S22: YES), the controller 80 advances to step S23. On the other hand, in step S22, when the prescribed conditions necessary for the transition to the flat-rate printing state are determined not to be met in the printing device 1 (S22: NO), the controller 80 waits for step S20 to be executed again.

In step S23, the controller 80 executes transition process to carry out the transition of the printing device 1 into the flat-rate printing state. Once the transition is realized, the controller 80 transmits, to the server 209, a notification informing completion of the transition of the printing device 1 into the flat-rate printing state (transition notification). In this way, the printing device 1 can notify the server 209 of information indicating that the printing device 1 is ready to start using the flat-rate printing service.

Incidentally, when to transmit the transition notification to the server 209 is not particularly limited, as long as the transmission is completed before the flat-rate printing is actually performed in the printing device 1 (step S26). For example, in a case where the controller 80 is designed to periodically communicate with the server 209, the controller 80 may transmit the transition notification to the server 209 when communicating with the server 209 immediately after execution of step S22.

In step S24, the server 209 starts charging the printing device 1 for the flat-rate printing service. Specifically, in response to receiving the transition notification from the printing device 1, the server controller 93 of the server 209 updates the device information on the printing device 1. More specifically, the server controller 93 searches the server memory 92 for the device information on the printing device 1 from which the transition notification is transmitted, and changes the value of the start flag included in the said device information to the value indicating "done". Subsequently, the server 209 advances to step S25.

In step S25, the server controller 93 of the server 209 stores the number of printed pages at the time of starting the charging. Specifically, the transition notification transmitted from the printing device 1 includes the value of the second page count which is stored in the region 827 of the device memory 82 of the printing device 1. The server controller 93 stores the value of the second page count included in the transmitted transition notification as the value of the second page count for the device information of the printing device 1 that has transmitted the transition notification. Thus, the value of the second page count as of the start date of the flat-rate printing service in the printing device 1 (i.e., as of the start date of the billing for the flat-rate printing service) is stored in the server memory 92 of the server 209 as the device information for the printing device 1 (contract-covered device).

On the other hand, after transmitting the transition notification in step S23, the controller 80 of the printing device 1 advances to step S26.

In step S26, the printing device 1 executes the flat-rate printing. For example, after transmitting the transition notification to the server 209 in step S23, the printing device 1 executes the flat-rate printing, according to a user's input operation or in response to a print command transmitted from an external device (such as a personal computer) wired or wirelessly connected to the printing device 1. After executing the flat-rate printing, the controller 80 updates the value of the second page count stored in the region 827 of the device memory 82, and then notifies the server 209 of the updated value of the second page count. The sever 209 receives this updated value of the second page count.

In step S27, the server controller 93 of the server 209 obtains a value by subtracting the value of the second page count currently stored in the region 921 as the device information from the value of the second page count received from the printing device 1, and then stores the obtained value as the printed page number under flat-rate printing in the device information for the printing device 1. Further, the server controller 93 updates the value of the second page count currently stored in the device information for the printing device 1 with the received value (latest value) of the second page count.

Thereafter, the value of the second page count is configured to be transmitted from the printing device 1 to the server 209 at predetermined timings. Hence, every time the updated value is transmitted from the printing device 1 and received at the server 209, the server controller 93 of the server 209 calculates the difference between the received latest value for the second page count and the previously-received value for the second page count (the value of the second page count stored in the device information), and stores the obtained value (difference) in the region 921 of the server memory 92 as the printed page number under flat-rate printing. As such, the server 209 can grasp the number of printed pages under the flat-rate printing service.

<Technical Advantages of the Second Embodiment>

According to the above-described processing, the printing device 1 is allowed to execute the flat-rate printing when: the communication between the printing device 1 and the server 209 is established; and one or more contract cartridges are attached to the printing device 1. Thus, the flat-rate printing is available for use in the printing device 1 in a state where various information on the flat-rate printing is exchangeable between the printing device 1 and the server 209. That is, the period of "flat rate" for the flat-rate printing service starts to be counted. In this way, the printing device 1 can start using the flat-rate printing service at an appropriate timing.

Further, according to the above-described processing, after executing the transition process in step S23, the printing device 1 transmits the transition notification to the server 209 to notify the server 209 of the completion of the transition into the flat-rate printing state. With this configuration, the printing device 1 can notify the server 209 that the printing device 1 is going to use the flat-rate printing service. The transition notification from the controller 80 of the printing device 1 enables the server 209 to appropriately determine when to start charging for use of the flat-rate printing in the printing device 1.

<Modifications to the Second Embodiment>

In the second embodiment, the execution of step S20 triggers the execution of the consumable determination process of step S21. However, the timing for the controller 80 executing the consumable determination process is not limited to the above example.

For example, the controller 80 may be configured to determine when to execute the consumable determination process based on the communication state of the printing device 1 that is monitored in the communication-status monitoring process. More specifically, the controller 80 may execute the consumable determination process when determining that the communication between the printing device 1 and the server 209 has been restored from a non-communicable state therebetween. In this way, the restoration of the communication state of the printing device 1 with the server 209 from the non-communicable state may trigger the execution of the consumable determination process. With this configuration, the printing device 1 can enter the flat-rate printing state without delay at the timing of restoration of the communicable state with the server 209 when an appropriate consumable is attached to the printing device 1.

Further, in the second embodiment, the controller 80 may be configured to prohibit the execution of the flat-rate printing in the printing device 1 in a case where the controller 80 receives, from the server controller 93 of the server 209, a non-permission command not to permit the application of the flat-rate printing service in the printing device 1. With this configuration, even in the printing device 1 that has entered the flat-rate printing state, execution of the flat-rate printing can be prohibited by the non-permission command from the server 209. This configuration enables the service provider to stop offering the flat-rate printing service in case that a user of the printing device 1 covered by the flat-rate printing service does not pay for the flat-rate printing.

Still further, in the second embodiment, the controller 80 may execute error monitoring process to monitor occurrence of any error in the printing device 1. If this is the case, the timing for executing the error monitoring process is not particularly limited. For example, similar to the communication-status monitoring process, the error monitoring process may be periodically executed as long as the printing device 1 is powered. Alternatively, the error monitoring process may be executed in random order with the steps S211 and S212 in the consumable determination process. That is, the error monitoring process may be executed before the steps S211 and S212, between the steps S211 and S212, and after the steps S211 and S212.

In any event that the error monitoring process reveals occurrence of a particular error in the printing device 1, the controller 80 may determine that the printing device 1 is not eligible for the transition to the flat-rate printing state (the conditions suitable for the transition are not met in the printing device 1). That is, the controller 80 may determine not to execute the transition process in step S23 of FIG. 7.

With this configuration, the printing device 1 is configured not to start the flat-rate printing service while a prescribed is occurring. Thus, the flat-rate printing service is configured not to be started under such circumstances where the printing device 1 is experiencing some kind of physical or software-related error that may hinder execution of the flat-rate printing (for example, when a critical error is occurring in a hardware and the like in the printing device 1). This configuration can prevent the flat-rate printing service from being started in the printing device 1 in a state where the user cannot actually perform printing with the printing device 1.

3. Third Embodiment

A third embodiment of the disclosure will be described next. As a matter of convenience, those parts and configurations which function in the same way as those in the depicted first and second embodiments will be designated by the same reference numerals with those in the both embodiments, and descriptions therefor will be omitted hereinafter.

In the third embodiment, the controller 80 may be configured to further discriminate a third cartridge type "bundled", in addition to the described two types "commercial" and "contract," as the cartridge type of the ink cartridge 4. In the ink cartridge 4 of this third type, "bundled" is stored as the cartridge type in the second region 422 of the cartridge memory 42. This ink cartridge 4 whose cartridge type stored in the second region 422 indicates "bundled" is an ink cartridge that is boxed and shipped out together with a brand-new printing device 1 purchased by a user. Hereinafter, the cartridge of this "bundled" type will be referred to as a bundled cartridge (bundled consumable).

The bundled cartridge may be treated as a commercial cartridge or contract cartridge as agreed under the flat-rate printing service.

In a case where a bundled cartridge is attached to the printing device 1 operating in the non-contract mode, the attached bundled cartridge may be treated as equally as a commercial cartridge. That is, when a bundled cartridge is attached to the printing device 1 in the non-contract mode, the printing device 1 can execute ordinary printing using the attached bundle cartridge.

As an example, with the bundled cartridge attached to the printing device 1, the controller 80 may perform the following determination process in step S3 of FIG. 2 in response to receiving the transition instruction from the server 9.

Specifically, in the determination process according to the third embodiment, referring to FIG. 5, when determining in step S102 that no contract cartridge is attached to the printing device 1 but at least one bundled cartridge is attached to the printing device 1 (S102: YES), the controller 80 determines in S1 that the printing device 1 is "appropriate" for the transition (S103). Subsequently, in response to this positive determination result, the controller 80 performs the transition to the contract mode in the mode control process (in steps S4: NO to S5 of FIG. 2). Once the printing device 1 has entered the contract mode, the controller 80 may treat the attached bundled cartridge in the same manner as the contract cartridge. That is, the controller 80 may execute the flat-rate printing using the attached bundled cartridge which is treated just like the contract cartridge (the procedures after step S7 in FIG. 2 may also be performed).

On the other hand, in a case where a bundled cartridge is attached to the printing device 1 operating in the contract mode, the attached bundled cartridge may be treated as equally as the contract cartridge. That is, not only the contract cartridge but the bundled cartridge may also be treated as the "cartridge of a particular type" deemed suitable for the transition to the flat-rate printing state.

Accordingly, in the consumable determination process of FIG. 8, the controller 80 may determine in step S213 that the printing device 1 is in a suitable condition for the transition to the flat-rate printing state when at least one contract cartridge and/or at least one bundled cartridge is/are determined to be attached to the printing device 1 in step S212 (S212: YES).

Incidentally, the server 9 need not deliver the first-time contract cartridge to the printing device 1 that has entered the contract mode with the bundled cartridge mounted therein.

In the depicted embodiments, the flat-rate printing is described as an example of specific printing of the disclosure that a printing device can perform under a contract with a server of a service provider. However, the specific printing of the disclosure is not limited to the described flat-rate printing. For example, the specific printing may include: printing to be charged according to the number of printed sheets (pay-per-sheet); and printing up to a specific number of sheets according to advance payment. Further, the present disclosure may also be applicable to delivery service of consumables (such as cartridges) to a printing device from a service provider under a contract therebetween.

<Examples of Implementation by Software>

The controlling blocks of the printing device 1 and the server 9 may be implemented by a logic circuit (hardware) formed with an integrated circuit (IC chip) or by software.

In a case where the controlling blocks are embodied by software, each of the printing device 1 and the server 9 includes a computer executing, as software, instructions of a program that implement a corresponding function. For example, the computer includes at least one processor and a computer-readable storage medium storing the program. In the computer, the processor reads the program from the storage medium and executes the program, thereby achieving the object of the present disclosure. As the processor, the computer may use a CPU, for example. As the storage medium, the computer may use a "non-transitory tangible medium" such as a ROM (Read Only Memory), a tape, a disk, a card, a semiconductor memory, or a programmable logic circuit. The computer may also include a RAM (Random Access Memory) to develop the program therein. The program may be supplied to the computer via any transmission medium (e.g., a communication network or a broadcast wave) capable of transmitting the program. An aspect of the present disclosure may be implemented in a form of a data signal embedded in a carrier wave by which the control program is embodied according to electrical transmission.

While the description has been made in detail with reference to the embodiments thereof, it would be apparent to those skilled in the art that many modifications and variations may be made thereto without departing from the scope of the disclosure. Further, different techniques disclosed in respective embodiments would be combined as appropriate.

<Remarks>

The printing device 1 is an example of a printing device. The server 209 is an example of a server. The fixed-rate printing is an example of specific printing under a contract between the printing device and the server. The communication interface 81 is an example of a communication interface. The controller 80 is an example of a controller of the printing device. The routine in step S211 in FIG. 8 is an example of a communication status monitoring process to be executed by the controller of the printing device. The routine in step S212 in FIG. 8 is an example of a consumable determination process to be executed by the controller of the printing device. The routine in step S22: YES and S23 in FIG. 7 is an example of a transition process to be executed by the controller of the printing device. The routine in step S20 in FIG. 7 is an example of a detection process to be executed by the controller of the printing device. The routine in step S104 in FIG. 5 is an example of an error monitoring process to be executed by the controller of the printing device. The ink cartridge 4 is an example of a particular consumable. The housing 11 is an example of a housing, and the opening 12 is an example of an opening of the housing. The cover 14 is an example of a cover. The printing system 200 is an example of a printing system.

What is claimed is:

1. A printing device configured to execute a specific printing under a contract with a server, the printing device comprising:

a housing having an opening through which one or more consumables are attachable for use in the specific printing under the contract;

a communication interface communicable with the server; and a controller configured to perform:

a communication status monitoring process to monitor a communication state with the server through the communication interface;

a detection process to detect attachment of the one or more consumables to the housing or a user's operation to attach the one or more consumables to the housing;

a consumable determination process to determine whether a particular consumable is included in the one or more consumables attached to the printing device, the particular consumable being a consumable that meets a prescribed condition required for transition to a specific printing state where the specific printing under the contract is allowed, the controller being configured to execute the consumable determination process in response to detecting the attachment of the one or more consumables to the housing or the user's operation to attach the one or more consumables to the housing in the detection process; and a transition process to execute the transition to the specific printing state in a case where the communication state is determined to be communicable with the server in the communication status monitoring process, and the particular consumable is determined to be included in the one or more consumables in the consumable determination process.

2. The printing device according to claim 1, wherein the controller is further configured to notify the server of completion of the transition to the specific printing state after execution of the transition process.

3. The printing device according to claim 1, wherein the particular consumable is one of:

a contract-only consumable for exclusive use in the specific printing under the contract; and a bundled consumable boxed and shipped together with the printing device.

4. The printing device according to claim 1, further comprising a cover for opening and closing the opening of the housing, wherein the controller is configured to detect that the one or more of the consumables are attached to the housing in response to detecting that the cover is closed.

5. The printing device according to claim 1, wherein the controller is further configured to prohibit execution of the specific printing in response to receiving, from the server, a non-permission command prohibiting execution of the specific printing in the specific printing state.

6. The printing device according to claim 1, wherein the specific printing under the contract is flat-rate printing.

7. A printing system comprising:

a server; and a printing device capable of executing a specific printing under a contract with the server, the printing device comprising:

a housing having an opening through which one or more consumables are attachable for use in the specific printing;

a communication interface communicable with the server; and a controller configured to perform:

a communication status monitoring process to monitor a communication state with the server through the communication interface;

a detection process to detect attachment of the one or more consumables to the housing or a user's operation to attach the one or more consumables to the housing;

a consumable determination process to determine whether a particular consumable is included in the one or more consumables attached to the printing device, the particular consumable being a consumable that meets a prescribed condition required for transition to a specific printing state where the specific printing under the contract is allowed, the controller being configured to execute the consumable determination process in response to detecting the attachment of the one or more consumables to the housing or the user's operation to attach the one or more consumables to the housing in the detection process; and a transition process to execute the transition to the specific printing state in a case where the communication state is determined to be communicable with the server in the communication status monitoring process, and the particular consumable is determined to be included in the one or more of consumables in the consumable determination process.

8. A method for controlling a printing device, the printing device including a housing having an opening through which one or more consumables are attachable for use in a specific printing under a contract with a server, the method comprising:

a detection step to detect attachment of the one or more consumables to the housing or a user's operation to attach the one or more consumables to the housing;

a consumable determination step to determine whether a particular consumable is included in one or more of consumables attached to the printing device, the particular consumable being a consumable that meets a prescribed condition required for the printing device to execute transition to a specific printing state where the specific printing under the contract with a server is allowed, the consumable determination step being executed in response to detecting the attachment of the one or more consumables to the housing or the user's operation to attach the one or more consumables to the housing in the detection step; and a transition step to execute the transition of the printing device to the specific printing state in a case where the printing device is communicable with the server, and the particular consumable is determined to be included in the one or more consumables attached to the printing device in the consumable determination step.

9. A printing device configured to execute specific printing under a contract with a server, the printing device comprising:

a housing having an opening through which one or more consumables are attachable for use in a specific printing under the contract;

a communication interface communicable with the server; and a controller configured to perform:

a communication status monitoring process to monitor a communication state with the server through the communication interface;

a detection process to detect attachment of the one or more consumables to the housing or a user's operation to attach the one or more consumables to the housing;

a consumable determination process to determine whether a particular consumable is included in the one or more consumables attached to the printing device, the particular consumable being a consumable deemed suitable for being used in the specific printing under the contract, the controller being configured to execute the consumable determination process in response to detecting the attachment of the one or more consumables to the housing or the user's operation to attach the one or more consumables to the housing in the detection process; and a transition process to execute the transition to a specific printing state where the specific printing is allowed in a case where prescribed conditions are all met, the prescribed conditions comprising:

i) the communication state is determined to be communicable with the server in the communication status monitoring process; and ii) the particular consumable is determined to be included in the one or more of the consumables in the consumable determination process.

10. The printing device according to claim 9, wherein the controller is further configured to perform an error monitoring process to monitor occurrence of an error in the printing device, and wherein the prescribed conditions further comprise iii) no error is detected in the error monitoring process.

11. The printing device according to claim 9, wherein the controller is further configured to notify the server of completion of the transition to the specific printing state after execution of the transition process.

12. The printing device according to claim 9, wherein the particular consumable is one of:

a contract-only consumable for exclusive use in the specific printing under the contract; and a bundled consumable boxed and shipped together with the printing device.

13. The printing device according to claim 9, further comprising a cover for opening and closing the opening of the housing, wherein the controller is configured to detect that the one or more of the consumables are attached to the housing in response to detecting that the cover is closed.

14. The printing device according to claim 9, wherein the controller is further configured to prohibit execution of the specific printing in response to receiving, from the server, a non-permission command prohibiting execution of the specific printing in the specific printing state.

15. The printing device according to claim 9, wherein the specific printing under the contract is flat-rate printing.

* * * * *